July 21, 1953 | L. J. GIACOLETTO | 2,646,531

ELECTRON OSCILLATOR CIRCUIT

Filed Feb. 13, 1951 | 2 Sheets-Sheet 1

INVENTOR
LAWRENCE J. GIACOLETTO
ATTORNEY

July 21, 1953 L. J. GIACOLETTO 2,646,531

ELECTRON OSCILLATOR CIRCUIT

Filed Feb. 13, 1951 2 Sheets-Sheet 2

INVENTOR
LAWRENCE J. GIACOLETTO
BY
ATTORNEY

Patented July 21, 1953

2,646,531

UNITED STATES PATENT OFFICE 2,646,531

ELECTRON OSCILLATOR CIRCUIT

Lawrence Joseph Giacoletto, Eatontown, N. J., assignor to Radio Corporation of America, a corporation of Delaware Application February 13, 1951, Serial No. 210,709

50 Claims. (Cl. 315—27)

The present invention relates to improvements in electromagnetic oscillator circuits, particularly of the dynatron variety and is concerned more directly, although not necessarily exclusively, to dynatron type oscillators which are productive of non-sinusoidal wave forms.

More directly the present invention relates to improvements in dynatron type oscillator circuits so as to render these circuits suitable for use in cathode ray beam deflection circuits. In this respect, the invention is involved with the provision of an exceptionally high efficiency cathode ray beam deflection system based upon dynatron vacuum tube operation and utilizing novel power recovery current feedback operation.

In the past, the ability of dynatron type vacuum tubes to produce sustained oscillations due to their negative resistance characteristics has been well known. There are numerous records in the literature of attempts to cause oscillators to produce sinusoidal wave forms when in fact non-sinusoidal oscillation appeared to be the mode preferred. However, it does not appear anywhere in the prior art that efforts have been made to control or shape the dynatron oscillator wave form so as to meet the requirements of apparatus requiring anything other than a sinusoidal wave form or a wave form having a fundamental frequency component plus arbitrary quantities of harmonics. Nor has there appeared any evidence of power recovery circuits aimed at reducing the power supply requirements of the dynatron.

As is well known in the television art, to provide proper deflection for television cathode ray scanning and reproducing beams, it is necessary to generate what is termed a sawtooth waveform. In practice, it is found that a rather high degree of linearity must be provided in the television sawtooth deflection waveform in order to obtain satisfactory results. In television receivers for home use it is further required that rather large amounts of sawtooth waveform current be available for kinescope beam deflection. It is also desired that the generation of the necessary sawtooth current be carried out in a rather efficient manner so as to minimize the cost of deflection output circuits and their associated power supplies. Moreover, regardless of the high efficiency and linearity required of television deflection circuits, such circuits must be easily kept in synchronism with low level synchronizing signals as for example the synchronizing signals as broadcast by a television transmitter.

It is therefore an object of the present invention to provide a novel dynatron oscillator which is capable of highly efficient generation of non-sinusoidal waveforms.

It is another object of the present invention to provide a dynatron oscillator circuit which is capable of producing a sawtooth type waveform having a relatively high degree of linearity.

It is a further object of the present invention to provide a new and improved cathode ray beam deflection system for television apparatus which is exceptionally efficient in operation.

It is still further an object of the present invention to provide an improved type dynatron discharge tube which is particularly suited for use in the oscillatory generation of saw tooth waveforms suitable for use in cathode ray beam deflection circuits.

A still further object of the present invention resides in the provision of a complete television receiver deflection circuit capable of highly efficient generation of the needed sawtooth waveform current as well as the capability of being easily synchronized by applied synchronizing control signals.

In accordance with this last object it is further a purpose of the present invention to provide such a television deflection circuit which offers versatile control both as to the wave form and amplitude of the generated sawtooth deflection signal.

In carrying out the above objects and features of advantage, the present invention contemplates the use of a dynatron type discharge tube whose dynode circuit is provided with a load impedance at least several times higher than the negative resistance value of the dynatron dynode characteristic. In this way a wave form closely resembling a sawtooth deflection signal may be produced. Refinement of this wave form is accomplished by feeding back part of the output signal to the input of the dynode and providing damping means between the dynode and collector electrode of the dynatron. Linearity control means are provided by including one or more non-linear inductances in those portions of the oscillator circuit carrying dynode and collector electrode signal current. By varying the potential applied to the collector electrodes of the dynatron, the amplitude of the developed signal may be conveniently controlled while by variating the potential applied to the control electrode of the dynatron, the frequency of deflection wave form generation may be controlled.

By providing the above mentioned damping means between the dynode and control electrode of the dynatron, not only are wave form characteristics improved, but power conservation operation is realizable to enhance operating efficiency. In one form of the present invention, this damping means may be contained within the dynatron tube itself by treating the surface of the collector electrode with thermo-electron emissive material.

A more complete understanding of the objects and features of advantage provided by the present invention as well as a more thorough understanding of its mode of operation may be obtained through a reading of the following description especially when taken in connection with the following figures of the accompanying drawings, in which.

Figures 1, 2, 3, 4, 5, 6, 7, 8, 9:
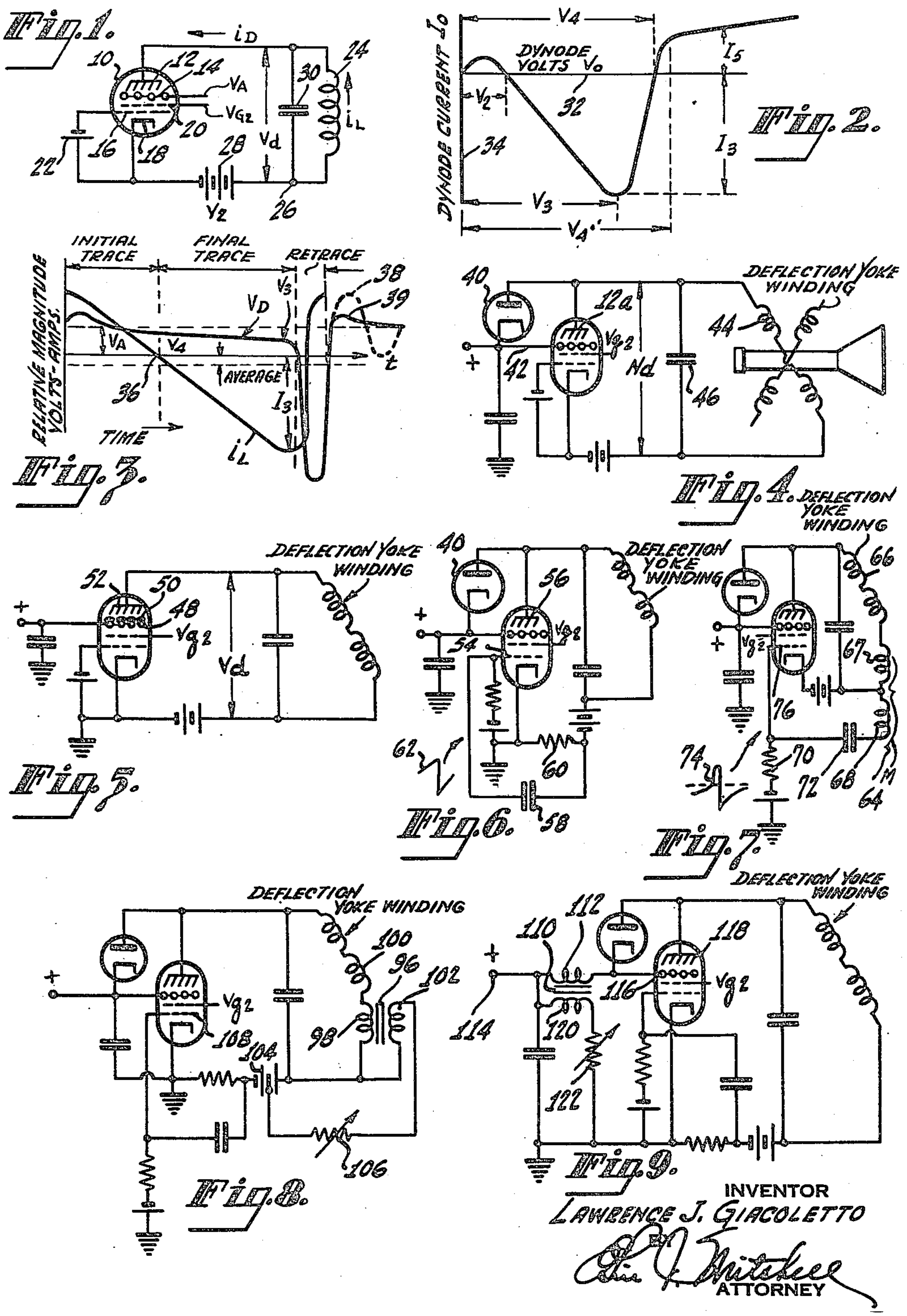
Figure 1 illustrates the circuitry of a basic dynatron oscillator to which the present invention relates.
Figure 2 is a graphical representation of certain electrical characteristics peculiar to a dynatron type vacuum tube.
Figure 3 is a graphical representation of certain electrical characteristics peculiar to the operation of a dynatron oscillator circuit in accordance with the present invention.
Figure 4 is a schematic representation of dynatron oscillator circuit utilizing the novel feature of the present invention so as to provide cathode ray beam deflection.
Figure 5 illustrates schematically another form of the present invention as applied to cathode ray beam deflection.
Figure 6 is also a schematic representation of an improved form of deflection circuit utilizing some of the novel features of the present invention.
Figure 7 illustrates schematically a still further embodiment of the present invention.
Figure 8 illustrates the general circuit characteristics of a cathode ray beam deflection circuit having versatile linearity control in accordance with the present invention.
Figure 9 illustrates still another form of dynatron deflection circuit having linearity control features in accordance with the present invention.

Turning now to Figure 1, there is shown at 10 a schematic representation of a well known dynatron type discharge tube. The dynatron has a dynode 12, a collector electrode 14, a control electrode control grid 16 and a cathode 18. Sometimes a screen electrode or screen grid 20 is provided for shielding purposes and for increasing the available gain in the dynatron stage when used as an amplifier. Suitable biasing means 22 are connected from the grid 16 to the cathode 18 for biasing the control electrode negatively with respect to the cathode. The dynode 12 is connected through an inductance 24 to a positive power supply terminal 26 which is maintained at a positive potential with reference to the cathode 18 by means of some form of power supply such as, for example, the battery 28. A capacitor 30 is placed in shunt with the inductance 24 to form a resonant circuit. The collector electrode and screen electrode 14 and 20 are, of course, maintained at some suitably positive value with respect to the cathode 18 by appropriate power supply means. The dynatron itself is well known in the art and needs no detailed description at this time. The operation of the dynatron depends upon secondary emission from the dynode electrode 12 when excited by electrons emitted from the cathode 18. The characteristics of the dynode material is such that a single cathode electron hitting the dynode structure at normal tube velocities will displace one or more secondary electrons which are collected by the positive collector electrode 14 to constitute a collector electrode current. Under these conditions the dynode acts as a virtual cathode with respect to the collector electrode. If of course the dynode voltage becomes positive with respect to the collector electrode, this secondary electron collection must cease and the dynatron tube acts in some measure like a pentode type vacuum tube. If further information on the dynatron is desired, reference may be made to an article entitled "Description of the dynatron" appearing in the February 1918 issue, volume 6, pages 5 through 36, of the "Proceedings of the Institute of Radio Engineers."

Detailed consideration as to just how the dynatron oscillator circuit of Figure 1 maintains oscillation is also well known in the art, as, for example, discussed by J. E. Houldin in an article entitled "Dynatron oscillator" appearing in the "Wireless Engineer," October 1937, volume 14, pp. 422–426. However, conditions for sustained oscillation can easily be found by referring to the dynode characteristic of the dynatron shown in Figure 2.

The graphical representation of Figure 2 presents a plot of dynode voltage along the abscissa 32 versus the dynode current along the ordinate 34. The dynatron 10 traverses this characteristic of Figure 2 during each cycle of oscillation and when operated in accordance with the present invention, is productive of the wave shape of Figure 3. The curve $V_D$ of Figure 3 represents the voltage appearing at the dynode 12 of the dynatron 10 during a cycle of oscillation. The curve $i_L$ on the other hand, represents the plot with respect to time of the current through the inductance 24 during oscillation of the dynatron circuit.

In accordance with the present invention, it has been found that by making the resonant resistance of the resonant circuit comprising inductance 24 and capacitor 30 at least three times greater than the negative resistance characteristic of the dynode, the curve $i_L$ of Figure 3 takes a form closely resembling a sawtooth wave form. The negative resistance value of the dynode, of course, may be graphically ascertained by measuring the slope of the curve in Figure 2 between the values $V_2$ and $V_3$. If L is the value of inductance 24 and C is representative of the value of capacitor 30, then in accordance with the present invention to obtain a near sawtooth wave form of current through the inductance 24, the value of the expression $$\frac{L}{CR}$$

should be at least three times greater than the dynatron negative resistance value. In this expression, R represents the combined effective resistance of the inductance 24 and any other circuit losses including those in the capacitor 30.

By carefully checking operating voltages and currents, an explanation for this mode of operation may be advanced. Consider the circuit of Figure 1 together with the dynode voltage and inductor current curve of Figure 3 keeping in mind the dynode characteristics of Figure 2. In order to launch the dynatron 10 upon the negative resistance portion of the characteristic, it is clear that the dynode voltage $V_D$ must be established at a value greater than $V_2$ (see Figure 2). Thus the value of the bias voltage 28 should be at least equal to $V_2$ of Figure 2. Now turning to Figure 3, let the operating point 36 where $i_L=0$ be examined first. In the dynode characteristic of Figure 2, one dynode voltage for which the dynode current is 0 is $V_4$ a value slightly less than $V_A$ where $V_A$ represents the collector voltage. This value of dynode voltage $V_4$ checks with the $V_D$ wave shape of Figure 3 at the operating point 36. Thus a voltage approximately equal to $V_A$ appears across L at the operating point 36 so that at this point $$\left(-L\frac{di}{dt}L\right)$$

must necessarily equal $V_4$. The negative sign is used in this expression because of the current direction $i_L$ chosen in Figure 1. The current $i_L$ now begins to increase negatively as shown in Figure 3 so as to produce the negative going portion of the sawtooth wave form referred to, for deflection purposes, as the final trace portion. From Figure 2, this negative increase of current can only occur if the dynode voltage decreases. This is shown by the curve $V_D$ in Figure 3. The current $i_L$ through the inductance 24 continues to decrease until the value $I_3$ (see Figure 2) is reached at which point the voltage on the dynode is equal to the value $V_3$. This is not a point of stable equilibrium as the voltage $V_3$ across the terminals of the inductance L demands an increasing negative current. From the curve in Figure 2, it is seen that the tube cannot supply this current at this value of voltage so that the additional current is taken from the parallel capacitor 30. This of course produces a further drop in the dynode voltage which in turn causes less current through the dynode which produces a further drop in the dynode voltage etc. so as to define a typically regenerative process.

Thus it is that the voltage on the dynode drops quickly to zero and then goes negative as the current $i_L$ through the inductance begins to reverse. In effect, since the voltage $V_D$ on the dynode swings negatively, the tube is disconnected from the circuit except for the floating dynode electrode. Following the reversal of the inductance current $i_L$ the dynode voltage $V_D$ begins to go positive. This process is speeded up as the dynode voltage is such as to produce negative inductance current when it again assumes a positive polarity with respect to the cathode. However, as the dynode voltage increases to a value larger than $V_A$ (see Figure 3) the dynatron emitter tube begins to operate as a pentode so that the inductor can discharge through the tube 10. The inductor current gradually decreases as the dynode voltage decreases until the inductor current $i_L$ again equals zero at point 36. This later decrease of inductor current representing the depletion of stored magnetic energy in the inductor 24 corresponds to the initial trace period of Figure 3. Thus the initial trace period and the final trace period merge at the operating point 36 to form substantially a sawtooth wave form.

In contrast with sinusoidal dynatron operation where the dynode characteristic of Figure 2 to the left of $V_3$ is primarily employed, the sawtooth current dynatron oscillator provided by the discreet selection of load circuit impedance in accordance with the present invention utilizes that portion of the dynatron characteristic appearing to the right of $V_3$ during most of the operating cycle. Hence the present invention allows advantageous use of a portion of the dynatron characteristic not heretofore relied upon by the prior art, namely that portion representing the major positive resistance section of the dynode characteristic in contradistinction to the major negative resistance characteristic of the dynode appearing between $V_2$ and $V_3$ in Figure 2.

Because of the peculiar characteristics of the dynatron tube and circuit shown in Figure 1, it is found that when the inductance current is positive, a pronounced positive peak may appear in the dynode voltage following the retrace interval of the simulated current sawtooth $i_L$. For the same reason, damped oscillations may follow the reversal of current in the inductance. Both of these generally undesirable effects are represented by the dotted line curve 38. Thus it is seen that although the simulated sawtooth waveform produced by the dynatron oscillator of Figure 1 when operated in accordance with the present invention as shown in Figure 3, is richer in harmonics than most prior art waveforms obtained from dynatron type oscillators, it is not perfectly suited for all types of sawtooth deflection purposes. Most objectionable from a television deflection standpoint, would be the irregularity 38 following the reversal of the current though the inductance, the inductance in this instance representing the inductance value of the well known magnetic deflection yoke.

In accordance with the present invention the arrangement of Figure 1 may be improved to provide a waveform as shown by the solid line curve 39 (Figure 3) by the provision of an additional diode 40 connected from the dynode 12*a* to the collector electrode 42 of Figure 4. The auxiliary diode 40 in Figure 4 may be considered as performing two functions. First it fulfills the requirement for additional current to the inductance when the voltage on the dynode is more positive than the collector voltage. Secondly this diode simultaneously accomplishes a power conserving function. Whereas for the circuit of Figure 1, the energy stored in the inductor during the final part of the trace cycle (from $i_L=0$ to $i_L$=negative maximum) is dissipated at the dynode during the initial part of the trace cycle (from $i_L$=positive maximum to $i_L=0$), now through the novel application of an auxiliary diode connected between the dynode and collector electrode, the energy stored in the inductor during the final part of the trace cycle is returned during the initial part of the trace cycle to the power supply from whence it came.

For the purpose of illustrating the applicability of the dynatron oscillator provided by the present invention to cathode ray beam deflection requirements, the inductance 24 in Figure 1 has been replaced by one winding of a deflection yoke shown at 44. The inductance of the winding 44 is equivalent to the inductance value above described in connection with the inductance 24 of Figure 1. Capacitor 46 acts in the same manner as capacitor 30 in Figure 1. In accordance with the present invention it is possible for the diode 40 to be replaced by any suitable damping means. For example, in Figure 5 the present invention contemplates the application of well known "cathode-spray" material to the surface of the dynatron collector electrode.

The collector electrode at 48 has the "cathode-spray" material 50 applied at least to the surface of the collector electrode adjacent the dynode 52. The "cathode-spray" material may for example be made of a suspension of barium, strontium and calcium carbonates in a binder such as nitrocellulose or a suspension of diatol or diethyl oxalate. The collector electrode 48 itself is preferably made of material which may be made fine enough to allow considerable temperature rise due to space currents accompanying normal usage of the dynatron. A very fine wire mesh or fine wire spiral for the collector electrode is excellent. The "cathode-spray" upon being heated by the collector electrode will then cause the collector to become a cathode with respect to the dynode 52 when the dynode 52 swings positively with respect to the collector electrode. Thus by coating the collector electrode with a cathode electron emissive material, there is provided a dynatron type tube having characteristics which are very valuable for use in circuits of the sawtooth generating variety. Such novel tube structure may, of course, find use in other circuits than sawtooth generating arrangements. For the purposes of the embodiment in Figure 4, however, the coating of the collector electrode as shown in Figure 5, allows the diode 40 to be eliminated and the power recovery damping action accomplished by reverse current conduction between the collector electrode and dynode due to the presence of the "cathode-spray." It will be understood that in all embodiments of the present invention shown in the drawings which incorporate an auxiliary diode connected by the dynode and collector electrode of a dynatron, the technique of Figure 5 may be applied.

Although introducing auxiliary damping means between the dynode and collector electrode of the dynatron provides a power conservation action, it will be seen that the diode does not completely eliminate secondary emitter tube current flow and accompanying power dissipation during the initial trace period of Figure 3. In accordance with the present invention, this disadvantage may be overcome by turning off the dynatron during the initial trace period and further, for even better efficiency and waveform, the dynatron should be turned on gradually during the final part of the trace cycle so as to coincide approximately with the gradual decrease in $i_L$ during the latter portion of the initial trace period. To obtain this mode of operation in accordance with the present invention, grid control is introduced in the dynatron circuit as for example, shown in Figure 6. In the embodiment of Figure 6 the control electrode 54 of the dynatron 56 is coupled by capacitor 58 to a resistance 60 which is serially included in the dynode cathode output circuit of the oscillator. If resistor 60 is made small, the voltage appearing across it will represent the current waveform $i_L$ of Figure 3, and hence a sawtooth control waveform 62 in Figure 6 will appear on the grid 54. The waveform 62 can be seen to be of the proper polarity to completely disable or cut off electron flow from the cathode during the initial trace portion of the deflection circuit in Figure 3. Furthermore, the sawtooth control waveform 62 allows gradual conduction to occur in the dynatron 56 during the first portion of the final trace period. This tends to improve linearity of the developed sawtooth by allowing the initial trace and final trace to more precisely coincide.

Figures 13, 14, 15:
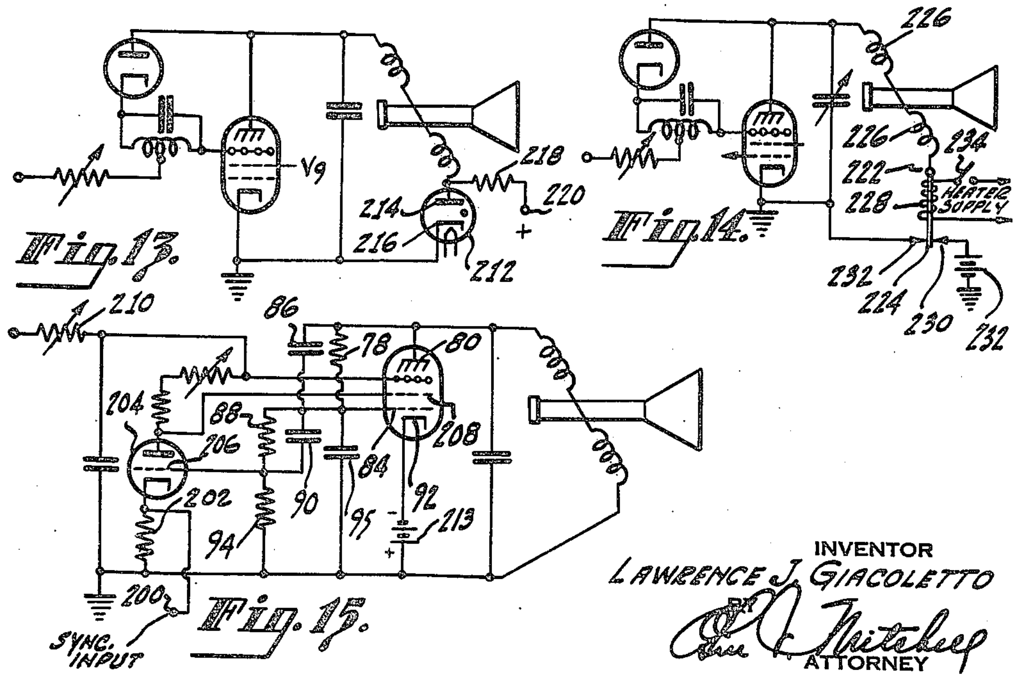
Figure 13 illustrates still another form of cathode ray beam deflection circuit utilizing other novel features of the present invention.
Figure 14 is a schematic representation of a dynatron type cathode ray beam deflection system embodying the novel features of the present invention.
Figure 15 is another schematic representation of a form of complete cathode ray beam deflection circuit of the dynatron variety suitable for use in modern day television systems and embodying several novel features of the present invention.

The embodiment of the present invention shown in Figure 7 illustrates another way of obtaining a control waveform for the dynatron grid. Here a transformer 64 is employed having its primary 67 connected in series with the deflection yoke winding 66. The voltage across the secondary 68 of the transformer 64 will then represent the sawtooth waveform of current flowing through the deflection yoke 67. This waveform is then applied across the resistor 70 via coupling capacitor 72 so as to apply the control waveform 74 to the control grid 76. The corrective action of the control waveform is substantially the same as that described with respect to Figure 6. As described more fully hereinafter, another method of obtaining a suitable control waveform for the dynatron control electrode is shown in Figure 15, wherein a resistor 78 is connected from dynode 80 to the control grid 84. The resistor 78 is by-passed by a capacitor 86 while resistor 88, capacitor 90 and resistor 94 form a voltage divider system with resistor 78 for drive of tube 206. Capacitor 95 acts as an integrating capacitor. Other means, of course, may be employed for obtaining a suitable control waveform for the control electrode of the dynatron than the exemplary arrangements shown in Figures 6, 7 and 15. These will readily occur to the reader after benefiting from the present teachings of the invention.

Even though the application of a control voltage to the control electrode of the dynatron improves both the efficiency and waveform of the produced sawtooth of current, it may be necessary in certain applications to exercise even further control over the waveform of the deflection current passing through the deflection yoke. In accordance with the present invention it is found that by placing one winding of a saturable core reactor in series with the deflection yoke, a significant control over the waveform of current through the yoke may be obtained. This arrangement is shown in Figure 8 of the drawings. Figure 8 differs only from the preceding embodiments shown in that a saturable core reactor is shown at 96. The primary 98 of the reactor is connected in series with the deflection yoke 100 as shown. The secondary 102 of the reactor is used as a control winding and is connected across a source of direct current potential such as the battery section 104. A rheostat or current control means 106 can be included in series with the winding 102 so as to control the saturation characteristic of the reactor 96 and hence the waveform of the current through the deflection yoke. As shown, the control voltage for application to the grid 108 is obtained in the same manner as that shown in Figure 6 only by way of example.

Another way of controlling the waveform of the deflection yoke current in accordance with the present invention is shown in Figure 9. Here a saturable core reactor 110 is shown having its primary winding 112 connected in series between the power supply terminal 114 and the collector electrode 116 of the dynatron 118. The secondary 120 of the reactor 110 is utilized as a control winding and has it left hand terminal connected to the positive power supply terminal 114, and its right hand terminal connected through resistor 122 to ground. By varying the current through the control winding 120, the core of the reactor 110 may be established at various points along its hysteresis curve and, therefore, reflects various values of inductance in accordance with current variations through the winding 112. The resistor 122 may be made variable so as to offer some range of control over the waveform correction. The remainder of the circuit of Figure 9 has been discussed above.

Figures 10, 12:
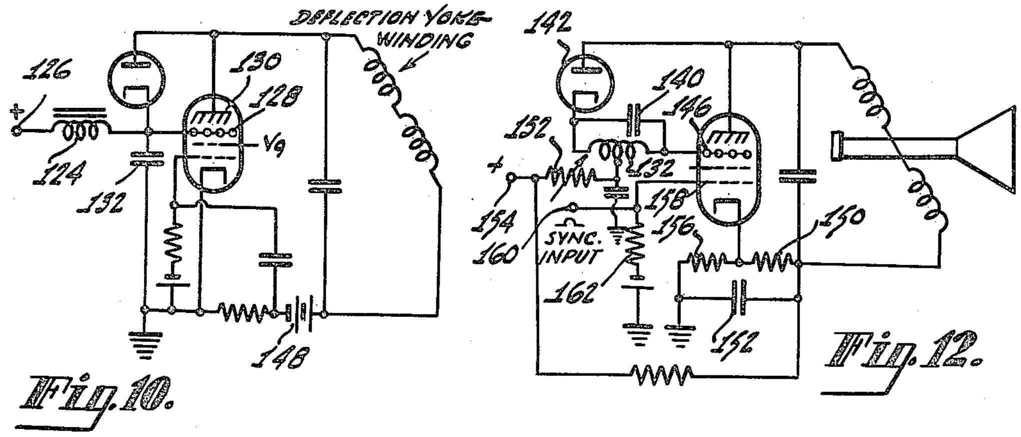
Figure 10 illustrates still another form of dynatron deflection circuit having novel linearity control features in accordance with the present invention.
Figure 12 is a schematic representation of a dynatron type cathode ray beam deflection circuit utilizing the novel features of the present invention to obtain both linearity and width control.
Figure 11:
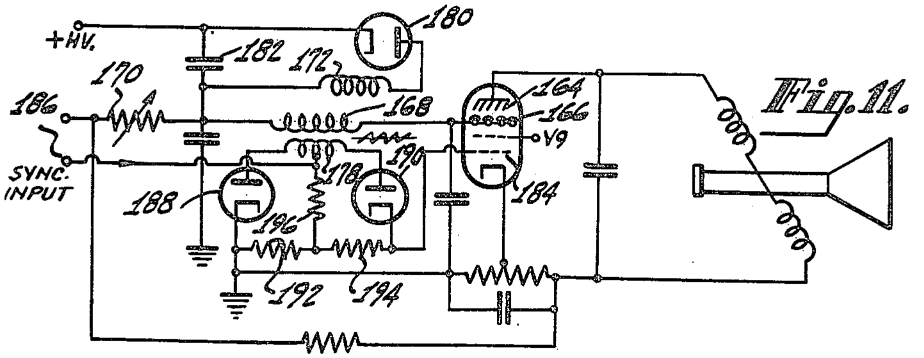
Figure 11 illustrates schematically a complete dynatron type cathode ray beam deflection circuit suitable for use in television receivers and embodying the novel features of the present invention.

Waveform and linearity control may also be accomplished in accordance with the present invention by the provision of a tuned circuit connected in the power supply circuit for the dynatron collector electrode. Examples of such novel technique are shown in Figures 10, 11, and 12. In Figure 10, an inductance 124 is connected from the positive power supply terminal 126 to the collector electrode 128 of the dynatron 30. A capacitor 132 is then placed between the collector electrode 128 and the cathode of the dynatron. The value of capacitor 132 is chosen with regard to the value of the inductance 124 so as to form a resonant circuit having a resonant frequency related to the repetition rate of the sawtooth waveform. By varying the frequency of this tuned circuit, it is found that various linearity control effects may be obtained. The remaining features of Figure 10 have been described above.

The use of a tuned circuit for purposes of obtaining linearity control is also shown in Figure 12. Here the tuned circuit comprises a tapped inductance 132 and a capacitor 140. A part of the inductance 132 is connected in series with the collector electrode power supply circuit as shown in Figure 10. However, the diode 142 instead of being connected directly to the collector electrode 146, is connected to the left hand tap of the inductance 132. This arrangement provides a slightly different mode of linearity control which may be advantageous in certain applications. In Figure 12, it will also be seen that the battery 148 of Figure 10 has been replaced by a resistor 150 suitably by-passed by a capacitor 152. This gives the circuit somewhat of a self-starting action.

In addition to linearity control it is of course desirable to provide some means for controlling the amplitude of sawtooth deflection current. In television deflection circuits, this control feature is generally referred to as a "width" control. In accordance with the present invention, "width" control may be obtained by varying the value of the potential applied to the collector electrode. In Figure 12 means for such control is shown as the rheostat 152 connected from the positive power supply terminal 154 to the center tap on the inductor 132. By varying the value of the rheostat 152, it is apparent that the value of voltage applied to the collector electrode 146 may be controlled. Also shown in Figure 12 is a typical self-biasing cathode resistor 156 which provides partial bias and degenerative feedback for the control electrode 158.

In any oscillator circuit it may become necessary to provide some means for synchronizing the generation of the output waveform with an applied control signal. In accordance with the present invention this may be accomplished as shown in Figure 12 by applying a synchronizing waveform to the control electrode 158. Synchronizing signal is applied to the sync input terminal 160 which is in turn directly connected to the control electrode 158. A resistor 162 is, of course, provided as in the previous embodiments to give some impedance to the grid circuit.

Synchronization of the oscillator action may, in accordance with the present invention, be also accomplished by a frequency comparator circuit shown by way of example in Figure 11. The entire circuit of Figure 11 represents a very practical form of television receiver deflection circuit. The dynatron 164 is of the special variety described in connection with Figure 5, that is, the collector electrode 166 is coated with electron emissive material so as to obviate the need of an auxiliary diode for power recovery and waveform control action. Linearity control is accomplished in the manner described in connection with Figure 10 by means of the inductance 168 connected in series with the collector electrode power supply. Variable resistance 170 is provided for "width" control as described in connection with Figure 12. The inductance 168 in Figure 11, however, is inductively coupled to the high impedance winding 172 and frequency control winding 178. The winding 172 is connected in shunt with a diode 180 so that the peaks induced in the winding 172 may be rectified to produce high unidirectional voltage across the capacitor 182. Circuit values may be adjusted so that the voltage across the capacitor 182 may be used as an accelerating voltage for a cathode ray beam kinescope.

In accordance with the present invention, synchronization of the sawtooth generator of Figure 11 is accomplished not by applying sync directly to the control electrode 184 of the dynatron 164, but is brought about through a novel application of the well known frequency comparator bridge circuit. The voltage appearing across the winding 178 is compared in frequency to that of the arriving sync information applied to the terminal 186. This is accomplished by means of diodes 188 and 190 connected across the winding 178 through resistors 192 and 194. A typical bridge circuit is formed through the connection of a resistor 196 from the center tap of the winding 178 and the connection between resistors 192 and 194. A direct current potential will then be developed at the cathode of diode 190 which will represent the difference between frequency of the oscillator or deflection waveform generated and arriving sync information. The operation of the frequency comparator per se is discussed in more detail in an article entilted "Automatic frequency and phase control of synchronization in TV receivers," by K. R. Wendt and G. L. Fredendall, appearing in the proceedings of IRE for January 1943.

Another complete deflection circuit suitable for application in television receivers and embodying the novel features of the present invention is shown in Figure 15. The feedback control voltage features of the circuit have been discussed above in connection with resistor 78, capacitor 86, and capacitor 95. In the embodiment of Figure 15, however, the present invention contemplates the use of a different form of frequency control arrangement. Here incoming sync applied to the input terminal 200, is conveyed to the cathode load resistor 202 connected in the cathode circuit of the frequency comparator triode 204. The sync input is in this triode 204, combined with the waveform applied to the control electrode 206 of the triode. The waveform applied to the control electrode 206 is derived from the junction of resistors 88 and 94 and is sawtooth in nature. As the incoming sync and the developed control voltage applied to the control electrode 206 change in phase with respect to one another, triode 204 will pass more or less average anode current. The screen electrode 208 of the dynatron in Figure 15, is connected to the anode of the triode 204. Thus, the frequency of dynatron oscillation will be controlled by varying the screen potential of the dynatron in accordance with coincidence between arriving sync and developed sawtooth signal. The general technique of developing a control voltage per se in accordance with a phase difference between two signals is discussed in an article appearing on page 58 of the "Radio and Television News" for January 1950. "Width" control of the deflection is, of course, accomplished by the resistor 210 in the manner described above in connection with Figure 12.

In order to assure quick starting of the oscillator deflection circuits described above, the present invention contemplates the use of a gas tube connected in series with a deflection yoke. This is shown in Figure 13 by way of example. The gas tube 212 may be of the voltage rectifying variety with its anode 204 connected with the deflection yoke and its cathode 216 connected with ground. The tube 212 is made to display a constant starting voltage corresponding to $V_2$ in Figures 1 and 2 by means of resistor 218 connected to a positive power supply terminal 220. This eliminates the need of providing a battery in series with the deflection yoke circuit to ensure reliable and quick starting.

Another self-starting dynatron biasing arrangement provided by the present invention is shown in Figure 15. Here the dynode is kept positive by the proper amount through the agency of a power supply source connected in the cathode-ground path of the dynatron. By way of example the power source is shown as battery 213 having its negative terminal connected to the cathode 92 and its positive terminal connected with ground. In accordance with the present invention any suitable power supply arrangement may be used so as to cause the cathode 92 to assume a negative potential relative to the dynode 80.

It is also found, in accordance with the present invention, that the presence of a constant voltage in series with the deflection yoke at times other than the actual starting period of the deflection circuit may be disadvantageous. The presence of this voltage has some influence upon the waveform of the deflection current. Since this starting voltage $V_2$ in Figures 1 and 2 is not needed once oscillation has started in the circuit, the present invention contemplates the use of some switching means for selectively disconnecting this voltage once oscillation has begun and the deflection circuit fully warmed up. This may be accomplished in a variety of ways. The automatic arrangement in Figure 14, however, is found particularly convenient and comprises a use of a thermo-relay 222 whose armature 224 is connected with the bottom end of the deflection yoke winding 226. The armature 224 may be of the bi-metal variety and responsive to temperature changes, so that when the heater winding 228 is energized, the armature 224 will swing to the left away from contact 230 to touch the left hand contact 232. Since a starting voltage may be applied to the contact 230 by means of a suitable power supply such as for example the battery 232, the oscillator circuit will start immediately when first energized. The power supply for the heater winding 228 of course may be connected to the heaters of the tubes in the television receiver or the switch 234 may be closed when television receiver is tuned on and the heating power derived directly from the power line. In any event, it will take some time for the armature 224 to heat up sufficiently to disconnect the starting voltage 232 and provide a direct connection from the bottom terminal of the deflection yoke 226 to ground. It is desirable that the thermo-relay 222 be provided with a "snap" action so as to prevent the yoke circuit from opening fully for any appreciable time.

From the above it can be seen that the applicant has provided a highly efficient and useful sawtooth generating arrangement which finds particular application to television receiver deflection circuits. The arrangement of the present invention is inexpensive and is found in practice to be capable of providing exceptionally good results.

What is claimed is:

1. In an electronic oscillator circuit the combination of, a dynatron type vacuum tube having at least a dynode, collector electrode, control electrode and cathode, an input circuit connected between said control electrode and said cathode, an output circuit connected between said dynode and said cathode, means for applying operating potentials to said dynode and said control electrode such that said dynatron characteristic represents a predetermined value of negative resistance reflected in said output circuit, a load impedance serially connected in said output circuit between said dynode and said cathode said load impedance having a value in ohms at least three times greater than said predetermined negative resistance value of said dynatron.

2. Apparatus according to claim 1 wherein said load impedance comprises a parallel resonant circuit made up of an inductance L, a capacitance C and an effective circuit resistance R such that the value of the expression $$\frac{L}{CR}$$

is at least three times greater than said predetermined dynatron negative resistance value.

3. In an electrical circuit, a dynatron vacuum tube having at least a dynode, collector electrode, control electrode and cathode, an input circuit connected between said control electrode and cathode, an output circuit connected between said dynode and said cathode, a positive power supply terminal connected to said collector electrode, means for applying operating potentials to said control electrode and said dynode such that said output circuit reflects a predetermined value of dynode negative resistance, and a load impedance connected in series with said output circuit, the value in ohms of said load impedance being at least three times greater than said predetermined dynode negative resistance value.

4. In an electrical circuit the combination of, a dynatron type electron discharge tube which includes a dynode, collector electrode, control electrode and cathode, an input circuit connected between said control electrode and said cathode, an output circuit connected between said dynode and said cathode, a positive power supply terminal connected to said collector, and a unilateral conduction device connected between said dynode and said collector electrode.

5. Apparatus according to claim 4 wherein said unilateral conduction device includes an anode type of electrode and a cathode type of electrode, said anode type electrode being connected with said dynode, and said cathode type electrode being connected with said collector electrode.

6. Apparatus according to claim 5 wherein said output circuit between said dynode and said cathode serially includes an inductance such that current changes in said output circuit may produce voltage variations across said inductance and thereby produce conduction in said unilateral conduction device.

7. In an electronic tube circuit including a dynatron type tube having at least a dynode, collector electrode, control electrode and cathode, a combination of, an output circuit connected from said dynode to said cathode, an input circuit connected from said control electrode to said cathode, means connected with said control electrode and said dynode for applying operating potentials thereto whereby to establish in said output circuit a reflected dynode negative resistance of a predetermined value, an inductance connected in series with said output circuit, the value of said inductance being such that when taken in connection with the circuit capacity appearing in shunt therewith there is created a parallel resonant circuit of predetermined frequency, the losses in said resonant circuit, the inductance value, and the circuit capacitance being further adjusted relative to one another to provide a resonant resistance which is at least three times greater than the negative resistance value of said dynode.

8. In a dynatron type discharge tube the combination of, an electron emissive cathode structure, a dynode target structure positioned with respect to said cathode to form an electron path, said dynode structure being treated with secondary emissive material such that secondary electrons are released by said dynode in response to electron bombardment by electrons emitted by said cathode, a collector electrode structure adjacent said dynode for collecting secondary electrons when said dynode appears negative with respect to said collector electrode, and a coating of a temperature responsive electron emitting material on that portion of said collector electrode which is in close relation to said dynode, whereby elevation in temperature of said collector produces electron emission from said collector electrode so that unilateral flow may be produced between said dynode and said collector electrode opposite to that produced by said secondary emission electrons.

9. Apparatus according to claim 8 wherein said collector electrode comprises a filament of thin wire of small enough cross-sectional diameter as to provide sufficient heating of said collector electrode electron emissive material during normal anticipated use of said dynatron to cause profuse electron emission from said collector electrode.

10. In an electrical oscillatory circuit a dynatron type discharge tube having at least a dynode, collector electrode control electrode and cathode, an input circuit connected between said control electrode and said cathode, an output circuit connected between said dynode and said cathode, a positive power supply terminal referenced to said dynatron cathode connected to said collector electrode, unilateral conduction means for causing conduction between said dynode and said collector electrode only when said dynode swings positively with respect to said collector, and a feed back circuit connected from said output circuit to said input circuit.

11. Apparatus according to claim 10 wherein said feed back means comprises a resistance connected in series with said output circuit in a direct connection from said load resistance to said dynatron control electrode.

12. Apparatus according to claim 10 wherein said feed back means comprises a transformer having its primary connected in series with said output circuit and its secondary connected with said input circuit.

13. Apparatus according to claim 10 wherein said feed back means comprises a resistor connected from said dynode to said control electrode.

14. In an electromagnetic cathode ray beam deflection system which includes an electromagnetic yoke for positioning adjacent a cathode ray beam generating system, the combination of, a dynatron type discharge tube having at least a dynode, a collector electrode, a control electrode and a cathode, an input circuit connected between said control electrode and said cathode, an output circuit connected between said dynode and said cathode, means for biasing said collector electrode positive relative to said dynode cathode, unidirectional conduction means connected between said dynode and said collector electrode so polarized as to cause conduction between said dynode and said collector electrode only when said dynode swings positively with respect to said collector electrode, means for coupling said output circuit with the electromagnetic deflection yoke, and a feed-back circuit connected from said output circuit to said input circuit.

15. In an electromagnetic deflection system the combination of, output terminals adapted for a driving connection to an electromagnetic deflection yoke, a dynatron type discharge tube having at least a dynode electrode, a collector electrode, a control electrode and a cathode, a connection from one output terminal to said dynode electrode, a connection from another output terminal and said cathode electrode whereby to form a load circuit between said dynode and cathode when a deflection yoke is connected with said output terminals, and a non-linear inductance connected in series with said load circuit.

16. Apparatus according to claim 15 wherein said non-linear inductance comprises one winding of an electromagnetic transformer having a saturable iron core, and means for connecting the other winding of said transformer with a source of electric power of such value as to produce a condition of at least partial saturation of said core material.

17. Apparatus according to claim 16 wherein said source of electric power is unidirectional in nature.

18. In a cathode ray beam deflection system the combination of, a pair of yoke driving terminals across which is normally connected an electromagnetic deflection yoke for positioning adjacent a cathode ray beam generating device, a dynatron type discharge tube having at least a dynode electrode, a collector electrode, a control electrode and a cathode, an input circuit connected between said control electrode and said cathode, a load circuit connected between said dynode electrode and said cathode, said load circuit including coupling from said dynode electrode and said cathode electrode to said yoke driving terminals, a feedback circuit providing coupling from said output circuit to said input circuit, and a non-linear inductance connected in series with said deflection yoke driving terminals.

19. In a cathode ray beam deflection system the combination of, a pair of yoke driving terminals across which is normally connected an electromagnetic deflection yoke for positioning adjacent a cathode ray beam generating device, a dynatron type discharge tube having at least a dynode electrode, a collector electrode, a control electrode and a cathode, an input circuit connected between said control electrode and said cathode, a load circuit connected between said dynode electrode and said cathode, said load circuit including coupling from said dynode electrode and said cathode electrode to said yoke driving terminals, a feedback circuit providing coupling from said output circuit to said input circuit, a positive power supply terminal referenced with respect to said dynatron cathode for biasing said collector electrode positive with respect to its cathode, and a non-linear inductance connected between said positive power supply terminal and said collector electrode.

20. Apparatus according to claim 19 wherein said non-linear inductor comprises one winding of an electromagnetic transformer having a saturable magnetic core, and means for connecting another winding of said transformer with a source of electric power of such magnitude as to at least partially saturate the magnetic core of said transformer.

21. Apparatus according to claim 20 wherein there is additionally provided rectifying means connected between said dynatron dynode and collector electrode so polarized as to allow conduction therebetween through said rectifying means only when said dynode assumes a potential positively in excess of said collector electrode.

22. In an electronic oscillator circuit the combination of, a dynatron type vacuum tube having at least a dynode electrode, a collector electrode, a control electrode and a cathode, a load circuit connected from said dynode to said cathode electrode, means for applying operating potentials to said dynode and said control electrode such that said dynatron characteristic represents a predetermined value of negative resistance reflected in said load circuit, said operating potential applying means including the connection of said collector electrode to a positive power supply terminal which is referenced to said dynatron cathode, a resonant circuit connected with said load circuit for producing sustained oscillations at a frequency related to the resonant frequency of said resonant circuit, and a non-linear inductor connected in series between said positive power supply terminal and said collector electrode.

23. Apparatus according to claim 22 wherein said non-linear inductor comprises one winding of an electromagnetic transformer having a saturable magnetic core, and means for connecting another winding of said transformer to a source of electric power of sufficient magnitude to produce partial saturation of said magnetic core.

24. Apparatus according to claim 22 wherein there is additionally provided an input circuit connected from said control electrode to said cathode, and means for coupling energy from said load circuit to said input circuit.

25. In an electronic oscillator circuit the combination of, a dynatron type vacuum tube having at least a dynode electrode, a collector electrode, a control electrode and a cathode, a load circuit connected from said dynode to said cathode electrode, means for applying operating potentials to said dynode and said control electrode such that said dynatron characteristic represents a predetermined value of negative resistance reflected in said load circuit, said operating potential applying means including the connection of said collector electrode to a positive power supply terminal which is referenced to said dynatron cathode, a resonant circuit connected with said load circuit for producing sustained oscillations at a frequency related to the resonant frequency of said resonant circuit, an inductance connected between said positive power supply terminal and said collector electrode, and a capacitor connected from said collector electrode to said dynatron cathode said capacitor and said inductance being so proportioned as to produce a resonant frequency bearing a predetermined fixed relation to the frequency of said dynatron oscillation.

26. A cathode ray beam deflection system comprising in combination, a set of yoke driving terminals adapted for normal connection with the terminals of an electromagnetic deflection yoke, a dynatron type discharge tube having at least a dynode electrode, a collector electrode, a control electrode and a cathode, an input circuit connected from said dynatron control electrode to said cathode, an output circuit connected from said dynode to said cathode, said load circuit including coupling to said yoke driving terminals, a positive power supply terminal referenced with respect to said dynatron cathode, an inductance connected from said positive power supply terminal to said dynatron collector electrode, and a capacitor connected from said collector electrode to said cathode.

27. Apparatus according to claim 26 wherein there is additionally provided coupling means connected from said load circuit to said input circuit.

28. Apparatus according to claim 27 wherein there is additionally provided rectifying means connected from said dynode to said collector electrode so polarized as to provide a conductive path between said dynode and said collector electrode whenever said dynode swings positively with respect to said collector electrode.

29. A cathode ray beam deflection system comprising in combination, a set of yoke driving terminals adapted for normal connection with the terminals of an electromagnetic deflection yoke, a dynatron type discharge tube having at least a dynode electrode, a collector electrode, a control electrode and a cathode, an input circuit connected from said dynatron control electrode to said cathode, an output circuit connected from said dynode to said cathode, said load circuit including coupling to said yoke driving terminals, a positive power supply terminal referenced with respect to said dynatron cathode, an inductance connected from said positive power supply terminal to said dynatron collector electrode, and a capacitor connected in shunt with at least a portion of said inductance.

30. A cathode ray beam deflection system comprising in combination, a set of yoke driving terminals adapted for normal connection with the terminals of an electromagnetic deflection yoke, a dynatron type discharge tube having at least a dynode electrode, a collector electrode, a control electrode and a cathode, an input circuit connected from said dynatron control electrode to said cathode, an output circuit connected from said dynode to said cathode, said load circuit including coupling to said yoke driving terminals, a positive power supply terminal referenced with respect to said dynatron cathode, a tapped inductor having a first, second and third taps, said second tap being intermediate between said first and third taps, a connection from said positive power supply terminal to said second tap, a connection from said third tap to said collector electrode, a capacitor connected in shunt with at least a portion of said inductor to form a resonant circuit therewith at a frequency value in the range of the designated operating frequency of the deflection circuit, and a rectifier unit connected from said dynode to said first inductor tap.

31. Apparatus according to claim 30 wherein there is additionally provided a terminal for receiving synchronizing signals for synchronizing said deflection circuit and a connection from said synchronizing signal receiving terminal to the control electrode of said dynatron discharge tube.

32. Apparatus according to claim 31 wherein there is additionally provided a variable resistance connected from said positive power supply terminal to the second tap on said inductor.

33. In an electronic oscillator circuit the combination of, a dynatron type vacuum tube having at least a dynode electrode, a collector electrode, a control electrode and a cathode, an input circuit connected between said control electrode and said cathode, an output circuit connected between said dynode and said cathode, a positive power supply terminal referenced to said dynatron cathode, a connection from said positive power supply terminal to said dynatron collector electrode, a load circuit connected between said dynode and said cathode, said load circuit including a resonant circuit for nominally defining the frequency of oscillator operation, a synchronizing signal input terminal adapted to receive sync signals for controlling said oscillator, a frequency comparing circuit having first and second input terminals, and an output terminal, said output terminal being adapted to deliver a unidirectional potential whose value is a function of the frequency difference between signals applied to said first and second input terminals, means connected with said dynatron for developing a reference voltage representing current variations in the dynode-collector electrode path of said dynatron, connections from the output of the said last named means to the first input terminal of said frequency comparing circuit, a connection from said synchronizing signal input terminal to said second frequency comparing circuit input terminal, and a connection from said frequency comparing circuit output terminal to one of the electrodes of said dynatron so as to change the potential of an electrode of said dynatron in accordance with the output information of said frequency comparing circuit.

34. Apparatus according to claim 33 wherein the output of said frequency comparing circuit is connected to the control electrode of said dynatron.

35. Apparatus according to claim 33 wherein there is included a transformer having a primary and secondary winding and wherein said reference voltage developing means comprises the connection of said transformer primary winding in series between said positive power supply terminal and said dynatron collector electrode and wherein said frequency comparing means comprises a first and second rectifying means connected to separate points on said secondary winding, each rectifying means having at least two terminals, a load resistance connected between two free terminals of both of said rectifying means, an impedance connected from a point along said secondary winding between said rectifying means to a point on said load resistance, and a connection from said synchronizing signal input terminal to said impedance and wherein said frequency comparing circuit output terminal comprises a point on said load resistance.

36. In an electron oscillator circuit, the combination of a dynatron type discharge tube having at least a dynode, collector electrode, a control electrode and a cathode, an input circuit connected between said control electrode and said cathode, an output circuit connected between said dynode and said cathode, a positive power supply terminal referenced to said dynatron cathode connected to said collector electrode, and unilateral conduction means for causing conduction between said dynode and said collector electrode only when said dynode swings positively with respect to said collector.

37. In an electromagnetic cathode ray beam deflection system which includes an electromagnetic yoke for positioning adjacent a cathode ray beam generating system the combination of, a dynatron type discharge tube having at least a dynode, a collector electrode, a control electrode and a cathode, an input circuit connected between said control electrode and said cathode, current supply means connected to said collector electrode and said dynode so as to supply current flow between said collector and said dynode during the operation of said dynatron, means for coupling said electromagnetic deflection yoke to said dynode and said cathode, current responsive voltage producing means connected with said current supply means for developing feedback voltage representative of current variations in the path between said collector electrode and dynode of said dynatron and means connected with said input circuit and said current supply means for feeding back at least a portion of said feedback voltage to said input circuit.

38. In a cathode ray beam deflection system the combination of, a pair of yoke driving terminals across which is normally connected an electromagnetic deflection yoke for positioning adjacent a cathode ray beam generating device, a dynatron type discharge tube having at least a dynode electrode, a collector electrode, a control electrode and a cathode, an input circuit connected between said control electrode and said cathode, a load circuit connected between said dynode electrode and said cathode, said load circuit including coupling from said dynode electrode and said cathode electrode to said yoke driving terminals, a positive power supply terminal referenced with respect to said dynatron cathode for biasing said collector electrode positively with respect to its cathode, and a non-linear inductance connected between said positive power supply terminal and said collector electrode.

39. In a cathode ray beam deflection system the combination of, a pair of yoke driving terminals across which is normally connected an electromagnetic deflection yoke for positioning adjacent a cathode ray beam generating device, a dynatron type discharge tube having at least a dynode electrode, a collector electrode, a control electrode and a cathode, an input circuit connected between said control electrode and said cathode, said load circuit including coupling from said dynode electrode and said cathode electrode to said yoke driving terminals, and a non-linear inductance connected in series with said deflection yoke driving terminals.

40. In an electronic oscillator circuit the combination of, a dynatron type vacuum tube having at least a dynode electrode, a collector electrode, a control electrode and a cathode, a load circuit connected from said dynode to said cathode electrode, an input circuit connected from said control electrode to said cathode electrode, means for applying operating potentials to said dynode and said control electrode such that said dynatron characteristic represents a predetermined value of negative resistance reflected in said load circuit, said operating potentials applying means including the connection of said control electrode to a positive power supply terminal which is referenced to said dynatron cathode, a resonant circuit connected with said load circuit for producing sustained oscillation in said dynatron at a frequency related to the resonant frequency value of said resonant circuit and feedback means connected from said output circuit to said input circuit.

41. Apparatus according to claim 40 wherein said feedback means includes an integrating network connected in said input circuit.

42. In an electromagnetic oscillator circuit a combination of a dynatron discharge tube having at least a cathode, collector electrode, control electrode and dynode, an input circuit connected between said dynatron control electrode and said cathode, an output circuit connected between said dynode and cathode, said output circuit including a series inductance element, a gas tube connected in series with said output circuit between said dynode and said cathode and means for establishing and maintaining said gas tube in a state of constant voltage conduction.

43. Apparatus according to claim 42 wherein said circuit is an electromagnetic deflection system for a television receiver and wherein said output circuit inductance includes the connection of an electromagnetic deflection yoke so connected as to be in series with said gas tube.

44. In an electronic oscillator circuit the combination of, a dynatron type discharge tube having at least a dynode electrode, a collector electrode, a control electrode and a cathode electrode, a single pole double throw switching means having an armature and a first and second contact selectively and alternately engaged by said armature, an inductance connected from said dynode electrode to said armature, a connection from one of said switching means contacts to a positive power supply terminal referenced with respect to said dynatron cathode and a connection from other switch contact directly to the cathode of said dynatron.

45. Apparatus according to claim 44 wherein said switch is thermoelectrically operated, and a control circuit for said switch such that said armature contacts said positive power supply terminal only during the first portion of any given oscillator operating interval.

46. In an electromagnetic cathode ray beam deflection system which includes a pair of yoke driving terminals adapted for normal connections with the terminals of an electromagnetic deflection yoke, the combination of, a dynatron type discharge tube having at least a dynode electrode, a collector electrode, a cathode and a screen electrode, an integrating network connected between said control electrode to said cathode, an inductance load connected between said dynode and said cathode, coupling means connected between said dynode and said integrating network, a positive power supply terminal referenced to said dynatron cathode, a resistor connected from said positive power supply terminal and said collector electrode, a capacitor connected from the collector electrode side of said resistor to said dynatron cathode, an electron discharge tube having at least an anode, cathode and control electrode, a connection from said discharge tube cathode to said dynatron cathode, a resistance connected from said dynatron collector electrode to said discharge tube anode, a connection from said dynatron screen electrode to said discharge tube anode, and a connection from said integrating network to said discharge tube control electrode.

47. In an electronic oscillator circuit the combination of, a dynatron type vacuum tube having at least a dynode electrode, a collector electrode, a control electrode and a cathode, a synchronizing signal input terminal adapted to receive synchronizing signals having a predetermined recurrence frequency, a load circuit connected from said dynode to said cathode electrode, means for applying operating potentials to said dynode and to said control electrode such that said dynode characteristic represents a predetermined value of negative resistance reflected in said load circuit, said operating potential applying means including the connection of said control electrode to a positive power supply terminal which is referenced to said dynatron cathode, a resonant circuit connected with said load circuit for producing sustained oscillations at a frequency integrally related to the recurrence frequency of said synchronizing signals, a frequency comparator circuit having a first and second input terminal adapted to receive signals to be compared and an output terminal adapted to deliver a unidirectional potential as a function of the frequency difference of signals applied to said input terminals, coupling means connected from said synchronizing signal input terminal to said frequency comparator first input terminal, coupling means connected from said dynatron to said frequency comparator second input terminal and a connection from said frequency comparator output terminal to one of said dynatron electrodes.

48. Apparatus according to claim 47 wherein said dynatron vacuum tube is of the screen grid variety having a screen electrode and wherein said output terminal of said frequency comparator means is connected with said screen electrode.

49. In an electronic oscillator circuit the combination of, a dynatron type vacuum tube having at least a dynode electrode, a collector electrode, a control electrode and a cathode, an input circuit connected from said control electrode to said cathode, a load circuit connected from said dynode to said cathode, means for applying operating potentials to said dynode and said control electrode with reference to said cathode such that said dynatron characteristic represents a predetermined value of negative resistance reflected in said load circuit, a resonant circuit connected with said load circuit for producing sustained oscillations in said dynatron at a frequency related to the resonant frequency of said resonant circuit, each cycle of dynatron oscillation having a conducting portion and a non-conducting portion, a signal terminal adapted to receive a voltage waveform synchronously related to said dynatron oscillation and having a negative going portion occuring during the non-conduction portion of said dynatron oscillation cycle and a connection from said signal terminal to said dynatron control electrode.

50. Apparatus according to claim 49 wherein said waveform applied to said input terminal, substantially sawtooth in nature and means for referencing said input terminal with respect to said dynatron cathode electrode such that negative going peak of said sawtooth wave form occurs during the non-conducting portion of said dynatron oscillation cycle.

LAWRENCE JOSEPH GIACOLETTO.

References Cited in the file of this patent

UNITED STATES PATENTS

| Number | Name | Date |
|---|---|---|
| 2,011,290 | Farnham | Aug. 13, 1935 |
| 2,011,291 | Rust | Aug. 13, 1935 |
| 2,297,522 | Zanarini | Sept. 29, 1942 |
| 2,369,631 | Zanarini | Feb. 13, 1945 |
| 2,466,065 | Weichardt | Apr. 5, 1949 |

FOREIGN PATENTS

| Number | Country | Date |
|---|---|---|
| 423,961 | Great Britain | Feb. 12, 1935 |